UNITED STATES PATENT OFFICE.

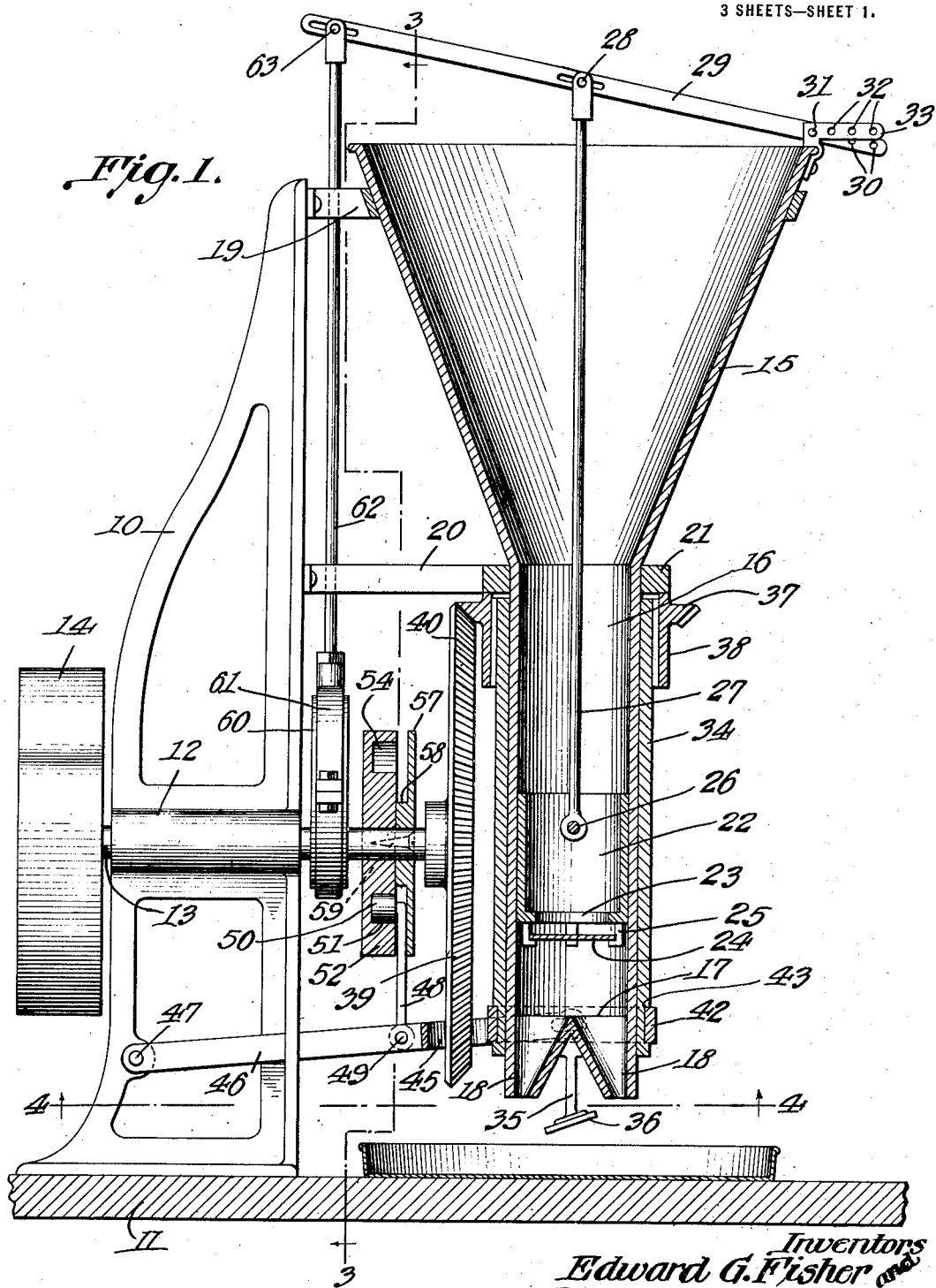

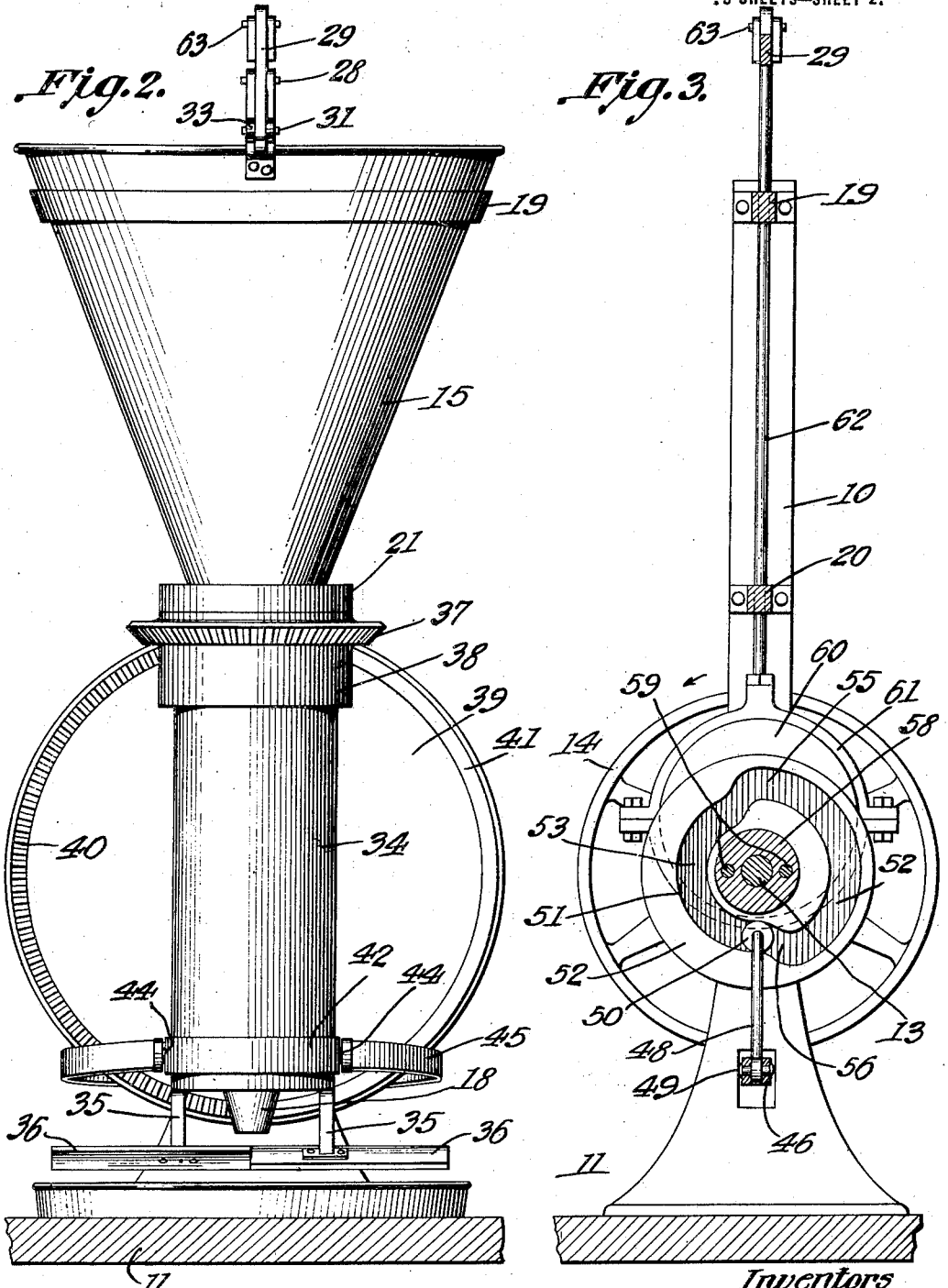

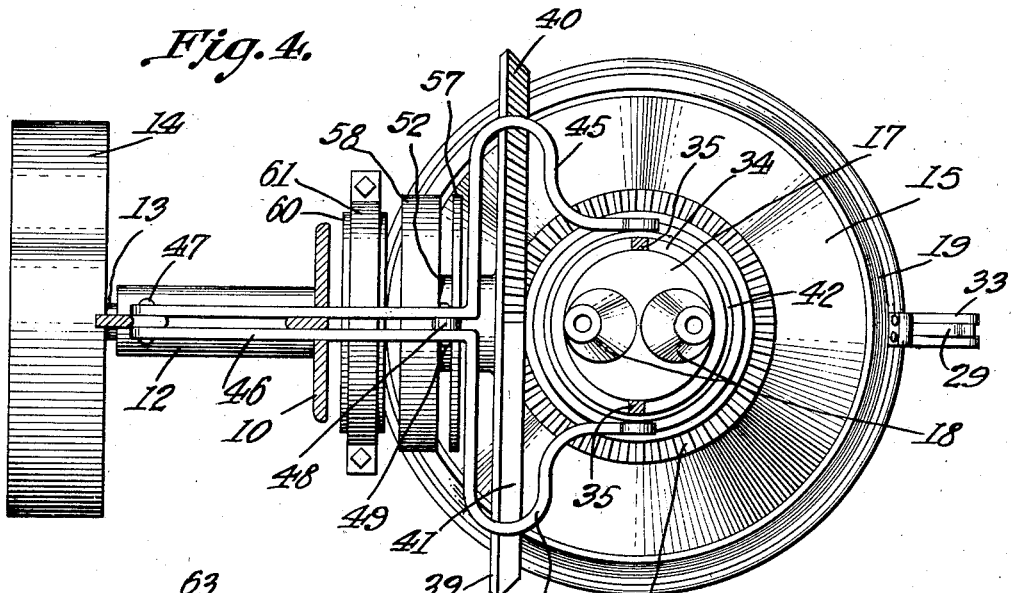
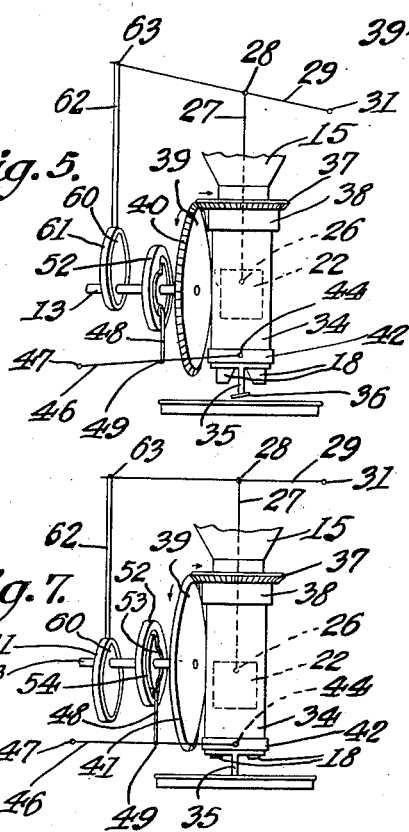
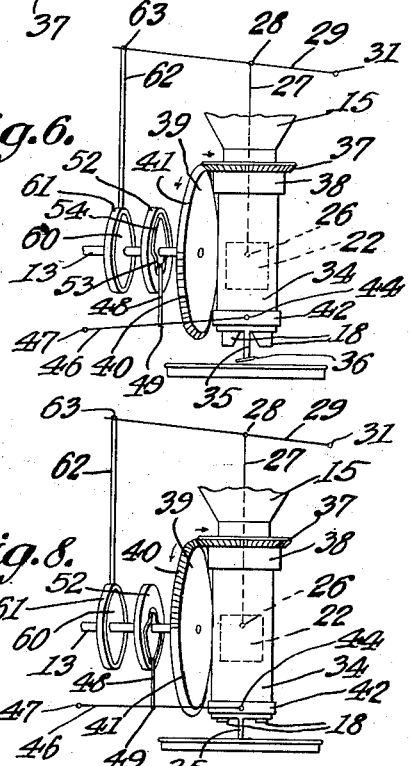

EDWARD G. FISHER, OF WASHINGTON, DISTRICT OF COLUMBIA, AND RUDOLPH J. H. MOESTA, OF BALTIMORE, MARYLAND.

LAYER-CAKE DEPOSITOR AND SPREADER.

1,358,716.    Specification of Letters Patent.    Patented Nov. 16, 1920.

Application filed June 14, 1920. Serial No. 388,875.

*To all whom it may concern:*

Be it known that we, EDWARD G. FISHER and RUDOLPH J. H. MOESTA, citizens of the United States, residing at Washington, District of Columbia, and Baltimore, State of Maryland, respectively, have invented certain new and useful Improvements in Layer-Cake Depositors and Spreaders, of which the following is a specification.

Our invention relates to a machine for manipulating dough, for producing the layers of a layer cake, while not necessarily restricted to this use.

An important object of the invention is to provide a machine of the above mentioned character, having means to deposit in a pan or the like, a selected amount of cake dough, with means to properly spread the same in a substantially uniform or even layer.

A further object of the invention is to provide means to turn or rotate the spreading element, while in contact with the dough, and to bodily shift the same away from the dough after the spreading operation, to permit of the removal of the pan containing the dough.

A further object of the invention is to provide a machine of the above mentioned character, which is wholly automatic in operation and will perform its several functions in a quick and reliable manner.

Other objects and advantages of the invention will be apparent during the course of the following description.

In the accompanying drawings forming a part of this specification, and in which like numerals are employed to designate like parts throughout the same, Figure 1 is a central vertical sectional view through a machine embodying our invention, Fig. 2 is an end elevation of the machine, Fig. 3 is a longitudinal section taken on line 3—3 of Fig. 1, Fig. 4 is a horizontal section, taken on line 4—4 of Fig. 1, looking upwardly in the direction of the arrows, Fig. 5 is a partly diagrammatic view, illustrating the first step in the cycle of operation of the machine, Fig. 6 is a similar view showing the second step in such cycle, Fig. 7 is a similar view showing the third step, and, Fig. 8 is a similar view showing the fourth step.

In the drawings, wherein for the purpose of illustration is shown a preferred embodiment of the invention, the numeral 10 designates an upstanding or vertical support or frame, which may be rigidly secured to a table top 11, or like support. The upstanding support 10 is provided with a horizontal bearing 12, receiving a transverse drive shaft 13 carrying a pulley 14, which may be driven by any suitable means.

The numeral 15 designates a hopper or holding receptacle, for receiving the cake dough or like material, and this hopper is preferably tapered or conical, decreasing in diameter downwardly, as shown. At its lower reduced end, the hopper continues in the form of a preferably cylindrical discharge tube 16. As more clearly shown in Fig. 4, the lower end of the discharge tube 16 is covered by a head 17, having a pair of tubular outlet elements or nipples 18, preferably diametrically oppositely arranged, as shown.

The hopper 15 and discharge tube 16 are preferably substantially vertically arranged, and a bracket 19 serves to connect the upper end of the hopper with the vertical support 10, while a bracket 20 connects the lower end of the hopper with this support. The bracket 20 carries a ring 21, encircling the discharge tube 16, and preferably rigidly attached thereto.

A plunger 22 is mounted to reciprocate within the discharge tube or cylinder 16, and is provided in its lower end with an opening 23, adapted to be covered by an upwardly seating valve 24, held within cage elements 25, secured to the plunger. The plunger 22 is hollow and is provided with a transverse interior pin 26, having pivotal connection with a rod 27, extending upwardly for pivotal connection, at 28, with a vertically swinging lever 29. This lever is provided at one end with a plurality of spaced apertures 30, any one of which may receive a bolt 31, to be passed through selected apertures 32, formed in an arm 33, which is rigidly mounted upon the top of the hopper. It is thus seen that adjustable means are provided to pivotally support one end of the lever 29, to vary its length, and effect a corresponding variation in the stroke of the plunger 22. By this means the amount of dough discharged from the tube or cylinder 16, upon each down stroke of the plunger, may be varied.

The numeral 34 designates an operating sleeve, which is slidable upon the tube or cylinder 16, to turn thereon and move longitudinally thereof. This sleeve, as more clearly shown in Fig. 2, is provided at its lower end with a pair of depending arms 35, rigidly secured thereto and preferably diametrically oppositely arranged. The arms 35 carry preferably transversely inclined radial spreading elements or paddles 36, preferably detachably secured thereto, in order that paddles of different lengths may be employed, in accordance with the diameter of the pan. It is preferable that the combined lengths of the spreading elements or paddles occupy substantially the entire diameter of the pan, whereby the entire surface of the dough will be spread or leveled. The spreading elements or paddles 36 are preferably faced in opposite directions. The invention is in no sense restricted to the use of the particular type of spreading elements shown and described.

Means are provided to rotate or turn the operating sleeve 34, preferably intermittently, comprising a bevel gear 37, carried by a tubular hub 38, which is keyed upon the upper end of the operating sleeve 34, so that the sleeve turns therewith but may move longitudinally with relation thereto. The upward movement of the hub 38 is prevented by contact with the ring 21, while its downward movement is prevented by engagement with a vertical bevel gear 39, rigidly mounted upon the shaft 13. The bevel gear 39 may be termed a stripped gear, and is provided throughout one-half of its circumference with teeth 40, while the other half 41 of its periphery, is smooth or has no teeth. The bevel gear 39 preferably has a diameter twice as great as the diameter of the bevel gear 37, and it is therefore apparent that upon each complete revolution of the bevel gear 39, the bevel gear 37 and sleeve 34 will be turned for one complete revolution, and brought to rest, the period of rest being equal to the period of rotation. The sleeve 34 is preferably constructed to have sufficient frictional engagement with the tube 16, so that there will be no tendency for the gear 37 and sleeve to move perceptibly by inertia, after the gear 37 has disengaged the gear teeth 40. It is obvious that the paddles 36, by engaging with the dough, also tend to prevent this movement which might be caused by inertia.

Means are also provided to raise and lower the operating sleeve 34, including a ring 42, rotatable in an annular groove 43, formed in the lower portion of the sleeve. This ring, Fig. 2, carries trunnions 44, pivotally connected with the forked end 45 of a vertically swinging lever 46. The forked end 45 is preferably circular, to surround the lower portion of the bevel gear 39, without contacting therewith. The lever 46 is pivoted at 47, with the support 10. A link 48, is pivoted at 49, with the lever 46, and this link has a roller 50 pivotally connected with its upper end. As more clearly shown in Fig. 3, the roller 50 is arranged to travel in a groove 51, formed in one face of a disk 52, rigidly mounted upon the shaft 13. The groove 51 embodies inner and outer curved concentric portions 53 and 54, connected by abrupt angular portions 55 and 56, as shown. A second disk 57 is arranged near the disk 52, and has a hub 58 secured to the disk 52, by screws 59 or the like. The disk 57 serves to retain the roller 50 in the groove 51.

The operating means for the lever 29 embodies a cam 60, rigidly mounted upon the shaft 13, and carrying a cam strap 61, connected with a rod 62, extending upwardly for pivotal connection with the lever 29, as shown at 63.

For a consideration of the operation of the machine, attention is particularly called to Figs. 5 to 8, inclusive. Fig. 5 shows the elements of the machine in the starting position. The cam 60 is in the upper position, and the plunger 22 is raised, whereby the lower end of the tube 16 is filled with dough. The roller 50 has just passed the angular portion 56 and has entered the intake end of the inner portion 53 of the groove 51. The sleeve 34 is therefore elevated, and the paddles 36 elevated above the pan. The pan may therefore be readily inserted beneath these paddles. Attention is called to the fact that the paddles are positioned at a right angle to the tubular outlets 18, and hence the dough will not be discharged upon the paddles. The bevel gear 39 is in the position whereby its last upper tooth 40 has disengaged the bevel gear 37, and the sleeve 34 is now at rest. In Fig. 6 is shown the step in the next quarter of a revolution of the shaft 13. The cam 60 has been turned to the horizontal position, and the plunger 22 has moved downwardly half of its stroke, and the dough is being discharged from the tubular outlets 18. The roller 50 is still within the inner portion 53 of the groove, at the center of such portion and the sleeve 34 is accordingly retained elevated. The gear teeth of the bevel gear 39 still disengage the bevel gear 37, whereby the sleeve 34 is not rotating. In the next step in the cycle of operation, Fig. 7, the shaft 13 has been turned for a quarter of a revolution, and cam 30 is in the lower vertical position, whereby the plunger 22 is in the lowermost position and the discharge of the dough from the tubular outlets 18 substantially completed. At this point, the angular portion 55 of the groove 52 receives the roller 50 and guides the same into the outer groove portion 54, whereby the sleeve 34 is lowered and the paddles brought into contact with the dough. The gear teeth 40 of the gear 39 have just engaged the gear 37. In Fig. 8, the fourth step in the cycle of operation is shown. The cam 60 is now horizontal but extending in the opposite direction to the same in Fig. 6, whereby the plunger 22 is raised for half its distance. The roller 50 is retained within the groove portion 54, and is now near its center, whereby the cylinder 34 is retained in the lowered position. The bevel gear 39 has rotated the spreaders for one-half of a revolution, and its teeth still engage the bevel gear 37. During the next quarter of a revolution of the shaft 13, the paddles are rotated for the remaining half of a revolution, and the elements restored to the position shown in Fig. 5.

It is to be understood that the form of our invention herewith shown and described is to be taken as a preferred example of the same, and that various changes in the shape, size, and arrangement of parts may be resorted to without departing from the spirit of our invention, or the scope of the subjoined claims.

Having thus described our invention, we claim:—

1. In a machine of the character described, a support, a receptacle carried thereby for holding dough, means for feeding dough from the receptacle to a pan or the like, spreading means adapted to contact with the dough within the pan and level the same, and automatic means timed in operation to actuate the feeding means and subsequently actuate the spreading means.

2. In a machine of the character described, a support, a receptacle carried thereby for holding dough, means for feeding dough from the receptacle to a pan or the like, spreading means to contact with the dough and level the same, means to lower the spreading means into contact with the dough, means to move the spreading means when in the lowered position, and automatic means timed in operation for actuating the feeding means, lowering means, and the moving means, in proper order.

3. In a machine of the character described, a cylinder, an operating sleeve slidable thereon, a spreading element carried by the sleeve, means to move the sleeve longitudinally, means to turn the sleeve upon its longitudinal axis, a plunger mounted within the cylinder, and means to move the plunger.

4. In a machine of the character described, a relatively stationary substantially vertical discharge tube, having tubular outlet elements near its lower end, said elements being substantially diametrically oppositely arranged, means to force dough from the tube through said elements, a sleeve rotatable upon the tube, a horizontally rotatable spreader carried by the sleeve and normally positioned between the outlet elements, and means to turn the sleeve for substantially a complete revolution and stop the same with the spreader in said normal position.

5. In a machine of the character described, a relatively stationary substantially vertical discharge tube, having its lower end covered by a head, said head having an outlet opening near its outer edge, a sleeve rotatable upon the tube, a spreading element carried by the sleeve and normally positioned upon one side of the opening, and means to turn the spreading element and stop the same in said normal position.

6. In a machine of the character described, an approximately horizontal support for receiving thereon a pan containing dough, an approximately vertical support extending above the first named support, an approximately vertical cylinder connected with the approximately vertical support and disposed above the pan, a feed plunger slidable within the cylinder, a sleeve slidable upon the cylinder, a spreading element carried by the lower end of the sleeve, a gear keyed upon the upper portion of the sleeve to rotate therewith and permit of the longitudinal movement of the sleeve, an approximately horizontal shaft carried by the approximately vertical support, a strip gear carried by the shaft and arranged to engage the first named gear, a vertically swinging lever connected with the sleeve to raise and lower it, a cam device connected with said shaft to move the lever, a second vertically swinging lever connected with the plunger to move it, and a cam device connected with said shaft to move the second named lever.

7. In a machine of the character described, a hopper for receiving dough or the like, a discharge tube depending from the hopper, a movable element operating within the discharge tube to positively force the dough therefrom, a spreading element pivotally connected with the tube to turn horizontally about the longitudinal axis of the tube, and means for effecting the turning movement of the spreading element.

8. In a machine of the character described, a hopper for receiving dough or the like, a discharge tube depending from the hopper, a movable element operating within the discharge tube to positively force the dough therefrom, a spreading element pivotally connected with the tube to turn horizontally about the longitudinal axis of the tube, and automatic means to raise and lower the spreading element and turn the same when in the lowered position.

9. In a machine of the character described, a hopper for receiving dough or the like, a discharge tube depending from the hopper, a plunger to reciprocate within the tube, a spreading element pivotally connected with the exterior of the tube to turn about the longitudinal axis of the tube, and means to turn the spreading element.

10. In a machine of the character described, a hopper for receiving dough or the like, a discharge tube depending from the hopper, a plunger to reciprocate within the tube, a spreading element pivotally connected with the exterior of the tube to turn horizontally about the longitudinal axis of the tube, means to raise and lower the spreading element with relation to the tube, and means to turn the spreading element when lowered and stop the same when raised.

In testimony whereof we affix our signatures in presence of two witnesses.

EDWARD G. FISHER.
RUDOLPH J. H. MOESTA.

Witnesses as to Rudolph J. H. Moesta:
 ELIZABETH L. NEWSOM,
 LEO L. JUDGE.